July 3, 1934.    L. SIMON    1,965,473
TELEMECHANICAL CONTROL DEVICE FOR SHOCK ABSORBERS
Filed Oct. 29, 1932
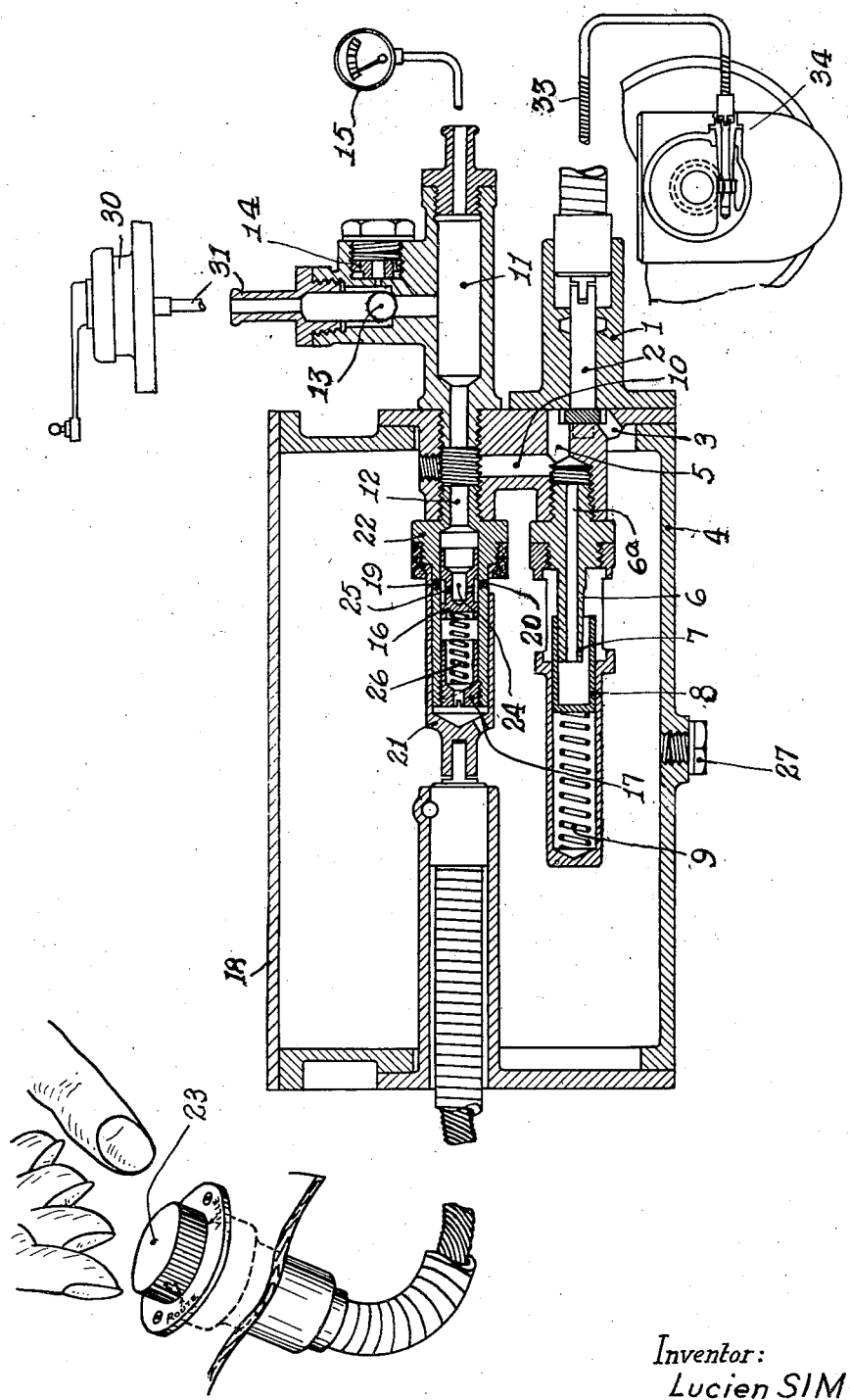
Inventor:
Lucien SIMON
by C. A. Snow & Co.
Attorneys.

Patented July 3, 1934

1,965,473

UNITED STATES PATENT OFFICE 1,965,473

TELEMECHANICAL CONTROL DEVICE FOR SHOCK ABSORBERS

Lucien Simon, Paris, France

Application October 29, 1932, Serial No. 640,300
In France June 8, 1932

6 Claims. (Cl. 188—87)

The object of the present invention is a device for telemechanical control of shock absorbers.

There are vehicle shock absorbers in which the braking action is constantly kept proportional to the speed of the vehicle owing to the compressing action of a liquid or fluid acting on suitable organs of the shock absorbers. For instance in shock absorbers of the mechanical friction type, the friction is constantly adjusted by the action of a fluid which applies the frictional elements against one another with a pressure proportional to the speed of the vehicle. Said pressure is generally obtained through a pump running at a speed that is a function of the speed of the vehicle.

The telemechanical control device according to the invention is characterized by the fact that it comprises, in the interior of a suitable space, a pump the flow of which is a function of the speed of the vehicle, and which is intended to feed to the shock absorbers an appropriate liquid at a pressure varying with the speed of the vehicle for the above mentioned purpose, and two relief valves, of which one is adjustable either manually or automatically and ceases to allow the liquid to flow therethrough as soon as the pressure has reached a suitable value, whilst the other is non-adjustable and works whatever the pressure may be.

The combined action of these relief valves permits of a great flexibility in working, the majority of the flow of the pump being absorbed at the starting of the vehicle by the adjustable relief valve, and the remainder flowing off through the fixed relief valve, while the latter is the only one continuing to allow a flow of fluid through it when the pressure has reached a suitable degree. A better distribution of pressure is thus obtained, and automatic adjustment is effected over a wider range than is the case where a single relief valve is used.

The invention further comprises other characteristics which are evident both from the description given hereunder and from the drawing attached as an example, which is a sectional view of a pump-relief valve group in accordance with the invention.

In the method of carrying out the invention shown as an example in the annexed drawing, a geared pump 2 the shaft of which turns at a speed proportionate to the speed of the vehicle in a sleeve 1, sucks up through orifice 3 the oil contained in space 4, to force it into conduit 5. From said conduit, a portion of the oil is allowed to flow into the inlet conduit 6ᵃ of an automatic relief valve 6 non-adjustable by hand. Said valve, which will be hereinafter called "non-adjustable relief valve", is fitted with splay cut or bevel 7, and more or less hooded by piston 8 which is subjected to the action of spring 9. The remainder of the oil from conduit 5 flows through piping 10, whence it flows partly into distributor 11 and partly into orifice 12 giving access to the body of adjustable relief valve 22.

Distributor 11 distributes the oil on the one hand to the pipes 31 leading to the shock absorbers 30 and on the other hand toward a control manometer 15 fitted on the apparatus board. Pipe 31 is provided with a valve 13 for preventing too sudden a return of the oil from the shock absorbers to the distributor. Said valve 13 is by-passed through a plug 14, provided with calibrated holes, as shown in the drawing, and removably fixed in the casing of distributor 11.

The adjustable relief valve comprises a piston 16 pushed upward by a spring 26 and masking, when it impinges on plug 17, discharge ports such as 19 and 20.

A rotating cylindrical shutter 21, controlled by means of a button 23 and a flexible connection, successively unmasks each of these ports 19 and 20.

The working of the device is as follows:

Geared pump 2, driven for instance, through a flexible shaft 33 connected to the mileage outlet of the speed change gear 34, feeds oil at a rate of flow depending on the speed of the vehicle.

When the oil pressure existing in pipes 5, 6, 10, 11, 12 is insufficient to push piston valve 16 against plug 17, the excess of oil fed by the pump is by-passed simultaneously and at low load through orifice 6 and splay cut 7 of the nonadjustable relief valve 6, and at full load through orifices 12, 24, 25 and the discharge port adapted to cooperate with valve 16, either 19 or 20, that is uncovered.

As soon as the oil pressure becomes sufficient, piston 16 impinges on plug 17, the whole of the ports 19 and 20 is covered up, and valve 16 ceases to allow oil to flow therethrough.

From this moment, the excess oil feed passes in its entirety through the non-adjustable relief valve.

In a case of the progressively increasing speed of the vehicle, the oil pressure increases in the pipes, following the variations in speed of the vehicle, which controls the working speed of the pump. The oil under pressure thus fed to the shock-absorption chambers of the suspension cylinder, suitably and progressively controls the angular displacements of the rod connecting the suspension to the running gear, and this obviates excessive oscillation of the carrying axle.

In the case of diminution of the speed of the vehicle, the oil pressure diminished in the pipes following the variation in speed: the pressure in the shock absorption chambers of the suspension cylinder, becoming less, proportionately relaxes the rod connecting, in its angular displacements, the suspension to the running-gear, and from this results a regulated oscillation of the carrying axle and a levelling of the exact pressure to the speed of the vehicle.

Finally, in the case of the maintenance of a given fixed speed over an unlimited period, the oil pressure is maintained in the pipes at a value which is in accordance with the speed considered. The surplus escapes through splay cut 7, which compresses spring 9, and, in the case of low speed, the excess of oil also escapes through ports 19 or 20 unmasked by cover 24.

Reservoir 4 may comprise an upper lid 18, possibly with hermetically tight joint and, at its base, an emptying plug 27.

It should be observed that the foregoing device, indicated as an example, does not permit of reversing, but this disadvantage is of small importance, seeing that distances travelled in reverse gear are of very short duration and generally undertaken at a low speed. A common free wheel device might possibly prevent the working of the pump in this case.

The forms and accessory arrangements of the different parts of the device described, dimensions, constituent elements, details and methods of execution may vary without going outside of the scope of the present invention.

What I claim is:

1. In a shock absorbing system for vehicles adapted to be controlled by a liquid under pressure, a pump, means for working said pump at a rate proportional with the speed of the vehicle, connecting means between said pump and the shock absorbing system for feeding liquid under pressure to said system, means, sensitive to the liquid pressure in said connecting means, for relieving the pressure in said connecting means, adapted to so function only when said pressure is below a given value, and means, sensitive to the liquid pressure in said connecting means, for relieving the pressure in said connecting means, adapted to work for any pressure whatever in said connecting means.

2. In a shock absorbing system for vehicles adapted to be controlled by oil under pressure, a closed vessel filled with oil, a pump adapted to suck oil from said vessel, means for working said pump at a rate proportional with the speed of the vehicle, connecting means between said pump and said shock absorbing system for feeding oil under pressure from said pump into said system, means, sensitive to the pressure in said connecting means, for allowing oil to flow back from said connecting means into said vessel, adapted to so function only when said pressure is below a certain value, and means, sensitive to the oil pressure in said connecting means, for allowing oil to flow back from said connecting means into said vessel, adapted to work for any pressure in said connecting means.

3. In a shock absorbing system for vehicles adapted to be controlled by oil under pressure, a closed vessel filled with oil, a pump adapted to suck oil from said vessel, means for working said pump at a rate proportional with the speed of the vehicle, a feed pipe for conveying oil under pressure from said pump to said shock absorbing system, a conduit branched on said feed pipe and opening into said vessel, a slide valve in said conduit subjected to the action of the liquid under pressure and adapted to cut off the connection between said conduit and said vessel when the oil pressure in the feed pipe reaches a predetermined value, and another valve disposed between said feed pipe and said vessel for permanently allowing oil to be by-passed from said feed pipe to said vessel.

4. A shock absorbing system according to claim 3 in which the second mentioned valve comprises a conduit connected with the feed pipe and extending into said vessel, the end of said conduit having a bevelled outer surface, a cap of cylindrical shape disposed opposite said end of the last mentioned conduit and adapted to slidably engage over it, and elastic means for urging said cap toward said conduit.

5. In a shock absorbing system for vehicles adapted to be controlled by oil under pressure, a closed vessel filled with oil, a pump adapted to suck oil from said vessel, means for working said pump at a rate proportional with the speed of the vehicle, a feed pipe for conveying oil under pressure from said pump to said shock absorbing system, a conduit branched on said feed pipe and extending into said vessel, said conduit being provided with at least one aperture for connecting it with said vessel, a slide valve in said conduit subjected to the action of the liquid under pressure therein and adapted to cover said aperture and thus cut off the connection between said conduit and said vessel when the oil pressure in the feed pipe reaches a predetermined value, movable means for adjustably covering said aperture, and another valve disposed between said feed pipe and said vessel for permanently allowing oil to be by-passed from said feed pipe to said vessel.

6. In a shock absorbing system for vehicles adapted to be controlled by a liquid under pressure, a pump, means for working said pump at a rate proportional with the speed of the vehicle, connecting means between said pump and the shock absorbing system for feeding liquid under pressure to said system, a passage provided with an adjustable discharge port connected with said connecting means whereby the pressure in said connecting means is relieved by the escape of liquid through said port, means operative by the liquid pressure in said passage for cutting off the flow of liquid to said port when said pressure is below a certain value, and means, sensitive to the liquid pressure in said connecting means, for relieving said pressure, adapted to work whatever the pressure in said connecting means may be.

LUCIEN SIMON.